(12) United States Patent
Wobben (10) Patent No.: US 7,850,354 B2
(45) Date of Patent: Dec. 14, 2010

(54) ROD SHAPED LIGHT FOR MARKING A TOWER WITH LIGHTS

(76) Inventor: Aloys Wobben, Argestrasse 19, Aurich (DE) 26607

( * ) Notice: Subject to any disclaimer, the term of this patent is extended or adjusted under 35 U.S.C. 154(b) by 376 days.

(21) Appl. No.: 11/814,278

(22) PCT Filed: Jan. 18, 2006

(86) PCT No.: PCT/EP2006/000394

§ 371 (c)(1),
(2), (4) Date: Apr. 9, 2008

(87) PCT Pub. No.: WO2006/077084

PCT Pub. Date: Jul. 27, 2006

(65) Prior Publication Data

US 2008/0192460 A1  Aug. 14, 2008

(30) Foreign Application Priority Data

Jan. 19, 2005  (DE)  ........................ 10 2005 002 650

(51) Int. Cl.
*F03D 11/00* (2006.01)
(52) U.S. Cl. ........................... 362/576; 362/415; 416/5; 52/28
(58) Field of Classification Search ................. 362/145, 362/576, 102, 147; 416/5, 224 R, 146 R; 52/28
See application file for complete search history.

(56) References Cited

U.S. PATENT DOCUMENTS

| | | | |
|---|---|---|---|
| 6,179,435 B1 * | 1/2001 | Wilson | ........................ 362/147 |
| 6,425,678 B1 | 7/2002 | Verdes et al. | |
| 2003/0156047 A1 | 8/2003 | Wobben | |

FOREIGN PATENT DOCUMENTS

| EP | 1544460 A2 | 6/2005 |
|---|---|---|
| JP | 2002279802 | 9/2002 |

OTHER PUBLICATIONS

English machine translation of EP 1 544 460, which was provided with the IDS submitted by Applicant.*
Montgomerie, "Obstacle Markings on Wind Turbines for Safe Aviation and Marine Navigation", XP-001236059, FOI Swedish Defence Research Agency, FOI Memorandum 979, Aug. 2004, 10 pages.

* cited by examiner

*Primary Examiner*—Jong-Suk (James) Lee
*Assistant Examiner*—Leah S Lovell
(74) *Attorney, Agent, or Firm*—Seed IP Law Group PLLC

(57) ABSTRACT

A rod-shaped light for marking a pylon or a pylon element, in particular of a wind power installation, with lights, is in the form of a rod-shaped holder, at the first end of which lighting means are arranged and at the second end of which lighting means connections are arranged. In order to equip a pylon, in particular of a wind power installation which has already been erected, or a pylon element for a wind power installation which is still to be erected, with a light marking arrangement, the rod-shaped light is fitted from the inside through a bore in the pylon wall so that the lighting means radiate into the surrounding area of the pylon.

18 Claims, 7 Drawing Sheets

ROD SHAPED LIGHT FOR MARKING A TOWER WITH LIGHTS

TECHNICAL FIELD

This disclosure concerns a rod-shaped light for marking a pylon, in particular but not exclusively of a wind power installation, with lights, comprising a rod-shaped holder, at the first end of which lighting means are arranged and at the second end of which lighting means connections are arranged. In addition one embodiment of the invention relates to a wind power installation whose pylon or pylon element is marked by at least two rod-shaped lights arranged in bores in a pylon wall. One embodiment of the invention further concerns a method of mounting a light marking arrangement of a pylon, in particular but not exclusively of a wind power installation.

BACKGROUND INFORMATION

The pylons of wind power installations which are usual at the present time do not have a nighttime lighting arrangement for marking them. In safeguarding air traffic in the proximity of the wind park, which frequently is of quite considerable extent and may comprise a plurality of individual wind power installations, a lack of nighttime identification is certainly a disadvantage as such areas have to be given a wide berth and represent an obstacle in particular for leisure air traffic.

DE 103 58 962 A1 discloses a wind power installation comprising a pylon having at least one outwardly radiating obstruction lighting means, for which purpose provided in the pylon is at least one opening through which a supply line is laid to the exterior from the interior of the pylon. Instead of electric lines for example a light source conductor can be passed as the supply line through the opening in order then to achieve a desired light emission characteristic by means of a prism or a lens system.

BRIEF SUMMARY

One embodiment of the invention provides a technical solution which is as simple and inexpensive as possible for equipping a pylon, in particular of a wind power installation which has already been erected, or a pylon element for a wind power installation which is still to be erected, with a light marking arrangement.

With an apparatus of the kind set forth in the opening part of this specification, in accordance with one embodiment of the invention a rod-shaped light can be fitted from the inside through a bore in the pylon wall so that the lighting means radiate into the surrounding area of the pylon. In that way, in a very simple and inexpensive fashion, a pylon of a wind power installation which has already been erected can be retrofitted with a light marking arrangement for safeguarding air traffic, at various heights of the pylon, or a pylon element of a wind power installation which is still to be erected can be pre-fitted with such a light marking arrangement, so that in the erected condition of the pylon it is then only still necessary to contact the lighting means connections.

The rod-shaped light according to one embodiment of the invention has lighting means at its first end and lighting means connections at its second end. The lighting means are for example light emitting diodes as nowadays they can be obtained relatively inexpensively and of such a nature as to produce great light intensities. Light emitting diodes enjoy a long service life so that the complication and expenditure in respect of maintenance operations on and replacement of rod-shaped lights are kept as low as possible. Furthermore light emitting diodes are very small so that a rod-shaped light is of a small diameter, in spite of being equipped with a plurality of lighting means of that kind. The rod-shaped light should be of the smallest possible diameter at the first end which can be fitted through the pylon wall as large bores in the pylon wall are to be avoided in consideration of the structural engineering stresses on the pylon.

The lighting means connections are connected by a plug to supply lines which are disposed in the interior of the pylon. Those lines are connected to a central control cabinet which provides for actuation, for example in the form of constant current actuation, of the rod-shaped light. This embodiment is particularly advantageous as in that way no electronics are required within the rod-shaped light. Such a rod-shaped light is particularly simple and inexpensive to produce. The operator of the wind power installation can therefore replace a defective rod-shaped light by a new one quickly, easily and inexpensively.

The lighting means are for example provided with a signal device in order to communicate the failure of a lighting means or of the plurality of lighting means to the operator of the pylon and to be able to change the rod-shaped light as quickly as possible. That signal device can for example comprise a photoresistor which provides information about the function of the lighting means. One embodiment is an extra signaling line as a signal device, in addition to the supply lines, which is connected to the lighting means by means of the lighting means connections. In that case the lighting means are connected in series so that a failed lighting means interrupts the flow of current and the signaling line passes a corresponding signal to the central control cabinet and thus to the operator. It would equally be possible to envisage a parallel circuit for the lighting means, which would have the advantage that, in the event of a failure of a lighting means, the other lighting means are not adversely affected in terms of their operation.

In one embodiment a cap is disposed as a protective layer over the lighting means, to protect the lighting means which are exposed to the weather from environmental influences, in particular weathering influences. In that respect an example configuration of that cap is a protective layer which is lined with transparent material. A dome which is disposed over the lighting means, for example of glass, is lined for example with transparent optical resin, which on the one hand protects the lighting means and seals them off in relation to the environment while on the other hand however also serving as means for fixing the lighting means within that dome.

In one embodiment a hoop, such as made from metal, is arranged over that protective layer in order to ensure protection for the lighting means and the protective casing from mechanical influences such as for example in relation to crane operations at the pod or the pylon.

The bore in the pylon wall, through which the rod-shaped light according to one embodiment of the invention can be fitted, is for example horizontal, that is to say oriented in parallel relationship with the ground, in order to ensure also horizontal orientation of the lighting means. In one embodiment, arranged in a horizontal bore in the pylon wall is a sleeve which serves as a guide for the rod-shaped light which can be fitted into the pylon wall. The rod-shaped light is the accurately fitting counterpart to the sleeve which predetermines optimum positioning of the rod-shaped light in such a way that the rod-shaped light is both oriented horizontally in the transverse axis and also the lighting means which are for example arranged in a line therein are disposed horizontally.

In addition provided on the sleeve or on the protective hoop is a device which defines the optimum position of the rod-shaped light, in which the rod-shaped light projects out of the pylon to such an extent that it emits light into a solid angle which is as large as possible. In that arrangement, disposed at the inside of the pylon wall is a support which permits optimum adjustment of the sleeve or the rod-shaped light respectively.

The lighting means are for example arranged in a line in order to ensure light emission which is as good as possible, in a horizontal direction. In such an embodiment a pylon, such as of a wind power installation, or a pylon element, is provided with at least two rod-shaped lights which are arranged thereon in a plane of the pylon, in such a way that it can be marked with lights in a solid angle of 360°.

In accordance with one embodiment of the invention, an arrangement for marking a pylon, in particular of a wind power installation, with lights, is mounted in such a way that the first end of a rod-shaped light is moved from the inside through a bore in the pylon wall, into a position of being visible from the outside, and the lighting means connections of the second end of the rod-shaped light are connected to supply lines disposed in the interior of the pylon. That permits simple and inexpensive retro-fitment to a pylon which has already been erected. That only requires operations which can be carried out from a platform disposed in the interior of the pylon so that there is no need for any complicated and expensive crane operations at the outside wall of the pylon. A hole which is intended for the rod-shaped light is drilled in the pylon wall, for example of a diameter of only a few centimeters, in order not to adversely affect the structural engineering aspects of the pylon. The rod-shaped light is of a small diameter at the first end so that it can be fitted into that bore in a closely fitting accurate relationship. The part which remains in the interior of the pylon serves for orientation of the rod-shaped light.

Based on the rod-shaped light according to one embodiment of the invention, a wind power installation or a pylon element is provided, wherein at least two rod-shaped lights are mounted to a pylon of a wind power installation or to a pylon element in such a way that said pylon or said pylon element is visibly marked in all directions which are relevant to air traffic. In that case the rod-shaped lights project out of the pylon to such an extent that for example two rod-shaped lights each emit light in 180° respectively or three rod-shaped lights each emit light in 120° respectively or similar embodiments in which at least two rod-shaped lights mark the complete space around the outside of the pylon with lights. In one embodiment as few bores as possible are drilled in the pylon wall in order to light up a solid angle which is as large as possible.

The option of retrofitting a pylon or equipping a pylon element, in particular of a wind power installation, with the light, is particularly advantageous in regard to the solution according to one embodiment of the invention. The lighting means can be inexpensively obtained and enjoy a long service life, which minimizes the ongoing costs for maintenance of the arrangement when already installed. As the rod-shaped light according to one embodiment of the invention is of a simple structure it can be manufactured in large numbers at a relatively low price. The rod-shaped light according to one embodiment of the invention is particularly advantageous as, in the event of failure of an individual lighting means, the complete light can be quickly and easily replaced from the interior of the pylon.

Further advantageous configurations of one or more embodiments of the invention are recited in further appendant claims.

The advantage of the rod-shaped light according to one embodiment of the invention is further that both the individual pylon elements are equipped with the rod-shaped light according to one embodiment of the invention before assembly of the pylon and also that the pylon when already installed can be retro-fitted therewith from the inside.

BRIEF DESCRIPTION OF THE SEVERAL VIEWS OF THE DRAWINGS

An embodiment by way of example of the invention is described in greater detail hereinafter with reference to the drawings in which.

DETAILED DESCRIPTION

Figure 1:
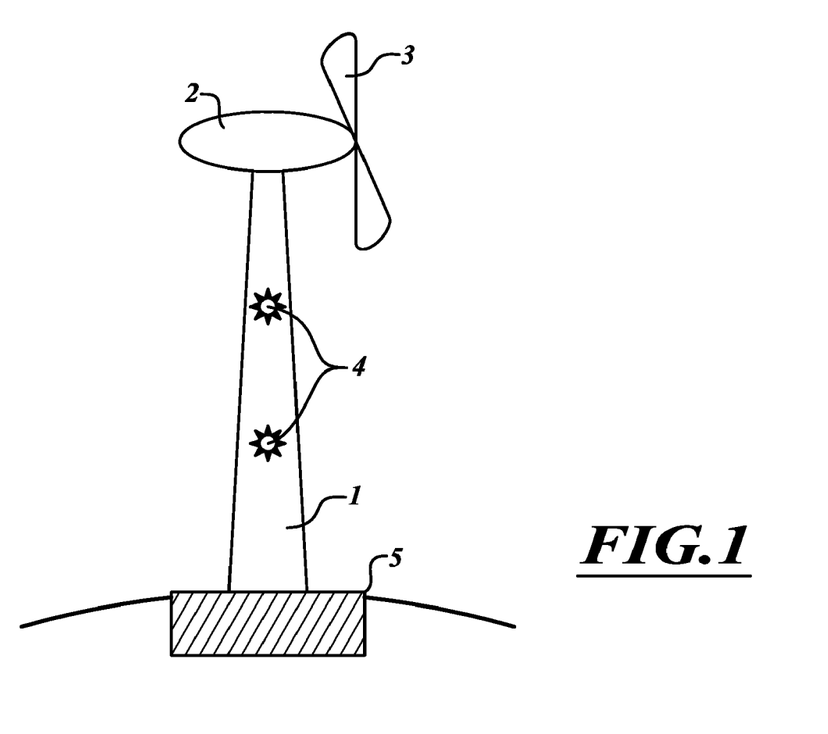
FIG. 1 shows a perspective view of a pylon of a wind power installation equipped with rod-shaped lights according to one embodiment of the invention arranged in two planes of the pylon.

FIG. 1 shows a pylon 1 of a wind power installation which is erected on a foundation 5. The machine pod 2 and the rotor blades 3 arranged thereon are disposed at the upper end of the pylon 1. Mounted on the pylon in two pylon planes are light marking arrangements 4 so that the pylon is visible to air traffic from far away.

Figure 2:
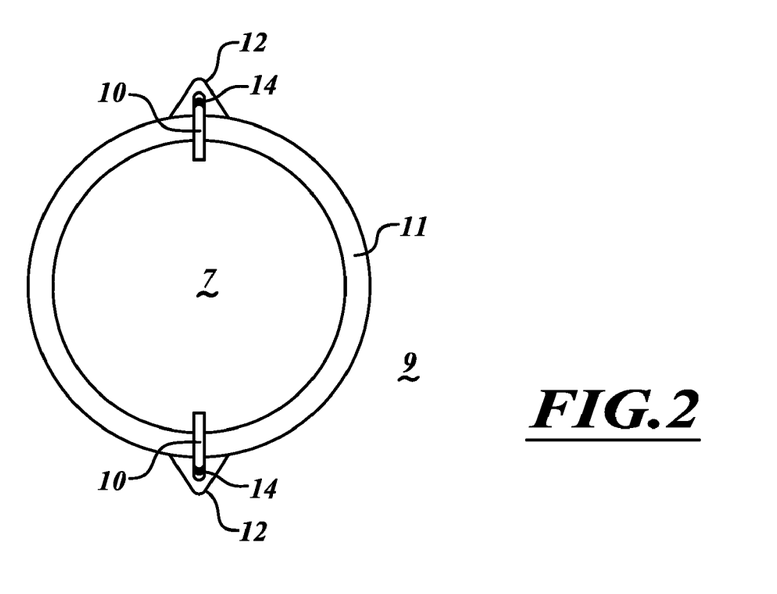
FIG. 2 shows a section through the transverse axis of a pylon with two installed rod-shaped lights according to one embodiment of the invention which are not shown true to scale.

FIG. 2 shows a cross-section through the pylon 1 of the wind power installation. Arranged in the pylon wall 11 are two rod-shaped lights 10 which are fitted out of the interior space 7 through bores in the pylon wall 11 and which emit light into the area 9 surrounding the pylon. In order to protect the lighting elements, such as lighting means 14 of the rod-shaped light 10, from mechanical and environmental influences, disposed over the rod-shaped light 10 is a protective device 12 which can also serve at the same time for correct positioning when the rod-shaped light 10 is installed in the pylon wall 11.

Figure 3:
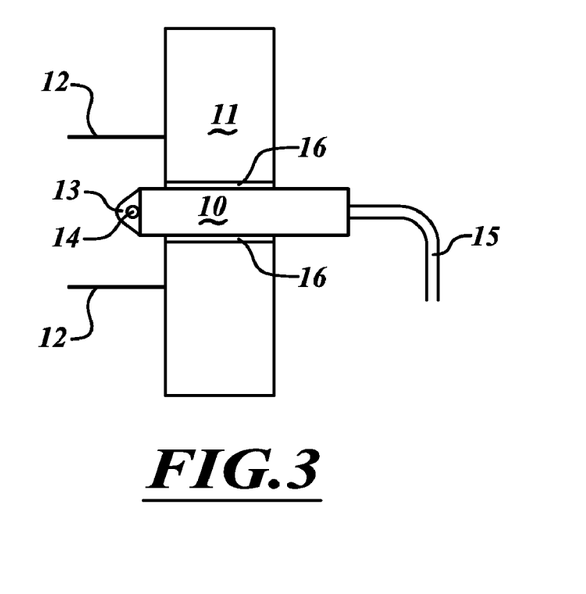
FIG. 3 shows a cross-section through the longitudinal axis of a pylon with an installed rod-shaped light according to one embodiment of the invention.

FIG. 3 shows the way in which the rod-shaped light 10 according to one embodiment of the invention is mounted in the pylon wall 11. The rod-shaped light 10 fits in accurately fitting relationship in a bore provided for that purpose in the pylon wall 11, wherein accurately fitting and horizontally optimized adjustment of the rod-shaped light 10 is achieved by means of a sleeve (not shown) which is introduced into the bore and guide means 16 which are fixed to the rod-shaped light. The first end of the rod-shaped light 10 which emits light into the area 9 around the pylon projects out of the pylon to such an extent that the lighting means 14 are visible from the outside in a solid angle which is of maximum magnitude. A protective layer 13, for example an optical resin, is arranged over those lighting means 14 in order to protect them from weathering influences. Disposed over that part of the rod-shaped light 10, which projects out of the pylon, is a protective hoop 12 in order to protect the rod-shaped light 10 with the lighting means 14 and the protective layer 13 from mechanical damage.

Arranged at the second end of the rod-shaped light 10 which projects into the interior 7 of the pylon are the lighting means connections 15 which are to be contacted with supply lines provided for that purpose in the interior 7 of the pylon.

Figure 4:
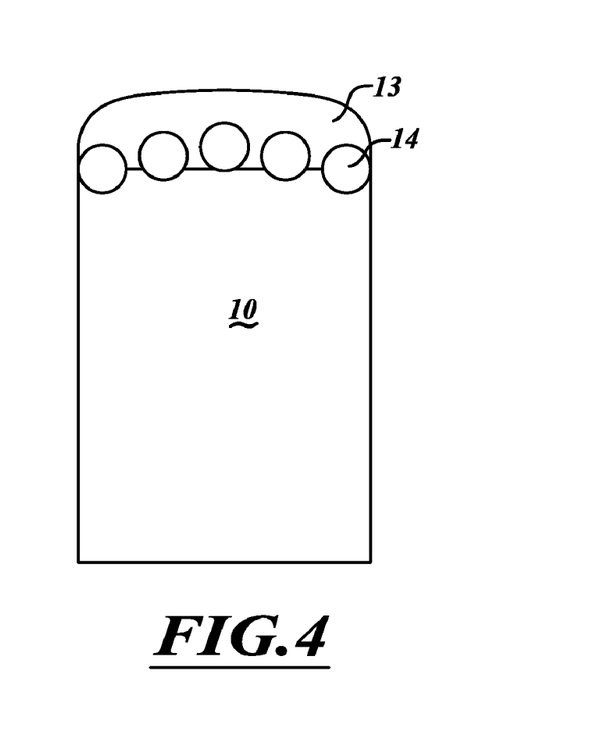
FIG. 4 shows a cross-section through the longitudinal axis of a rod-shaped light according to one embodiment of the invention.

FIG. 4 shows the lighting means 14 which is coated with a protective layer 13, for example optical resin, at the first end of the rod-shaped light 10 according to one embodiment of the invention. In the illustrated embodiment five light emitting diodes are arranged in a line, as the lighting means 14, so that they emit light in a horizontal plane in a solid angle of 180°.

One embodiment of the invention also concerns a configuration in which rod-shaped lights for marking the pylon with lights are arranged in a plurality of planes on the pylon. It is also possible to envisage marking the pylon with lights over less than 360° in the surrounding area if for example that is not required by virtue of the area around the pylon. The lighting means of the rod-shaped light can be arranged in a departure from a horizontal line. The mechanical protective hoop can for example be replaced by a mechanical protective device of another design configuration, for example a grid or a transparent dome of a mechanically robust material.

Figure 5A:
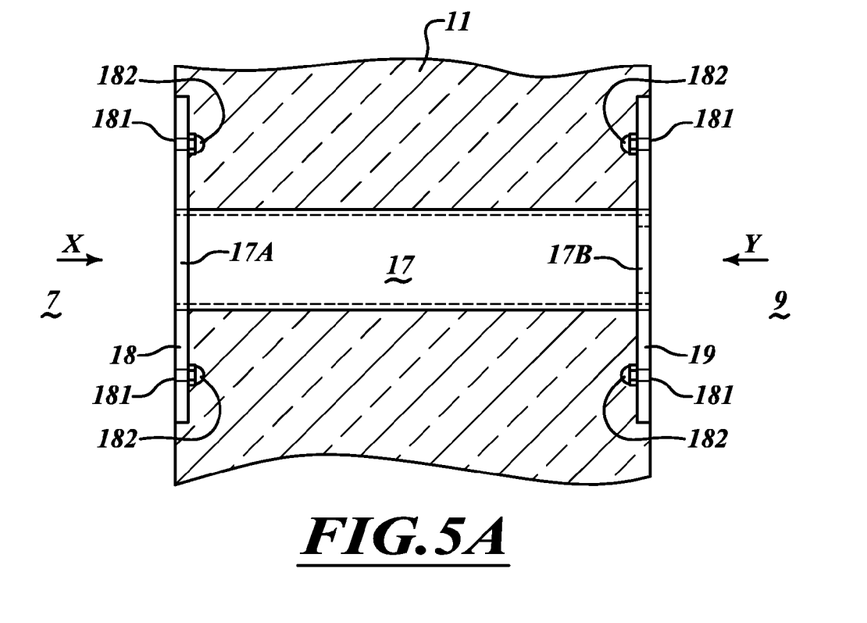
FIG. 5 shows a cross-section through the pylon wall and plan views of a ramming protection and a pipe clamp according to one embodiment.

An embodiment of the invention is described in greater detail hereinafter. FIG. 5A shows a cross-section through the pylon wall 11 of a concrete segment with a sleeve 17 which is cast therein and to the inner end 17A and the outer end 17B of which are welded to plates 18 and 19 respectively. That unit is also cast in place in production of the precast concrete member and is then fixedly incorporated in the concrete at the predetermined position, with the required orientation. Each of the plates 18, 19 has through holes 181 and 191 respectively, behind which nuts 182 and 192 respectively are welded on so that screws can be screwed through those plates.

Figure 5B:
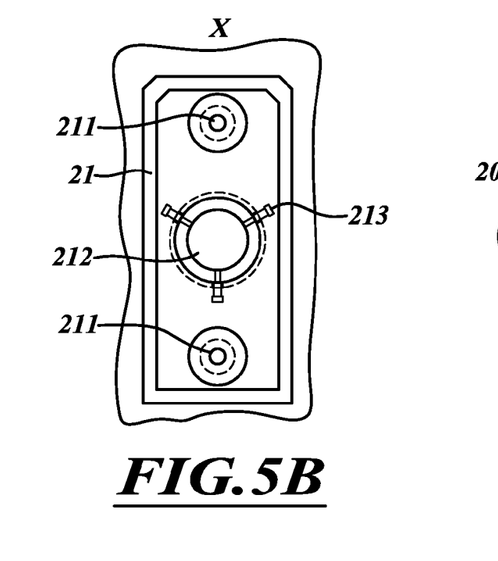
Figure 5C:
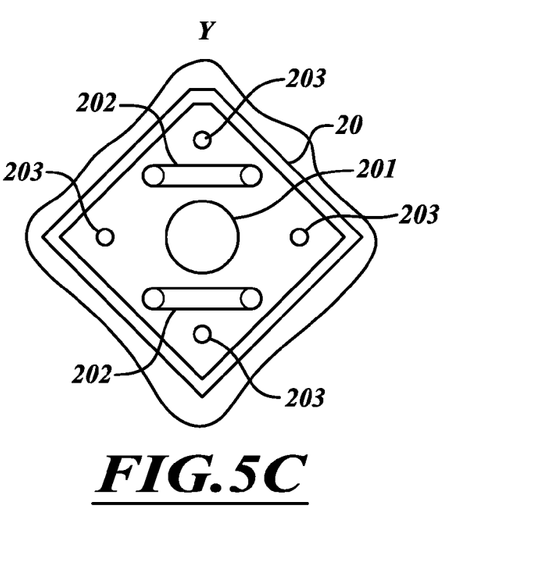

Screwed to the outer plate 19 is the so-called ramming protection 20 which is shown as a plan view in FIG. 5C. That ramming protection 20 is for example a plate with a central through hole 201 for the rod-shaped light and protective hoops 202 which are arranged above and below that through hole 201 and which form the actual ramming protection. That configuration also has holes 203 with which that ramming protection 20 can be screwed to the outer plate 19.

The inner plate 18 is prepared for fixing the rod-shaped light by means of the so-called pipe clamp 21, as is shown in a plan view in FIG. 5B. The view of the pipe clamp 21 shows two screws 211 with which it can be screwed on to the inner plate 18. Disposed at the centre of the pipe clamp 21 there is again an opening 212 through which the rod-shaped light can be passed and into which it can be fixed in the desired position by three screws and nuts 213 which are spaced uniformly around the periphery of the opening 212. The rod-shaped light can therefore be fitted into the sleeve 17, oriented in the desired fashion and finally fixed in position by means of those three screws 213.

Figure 6A:
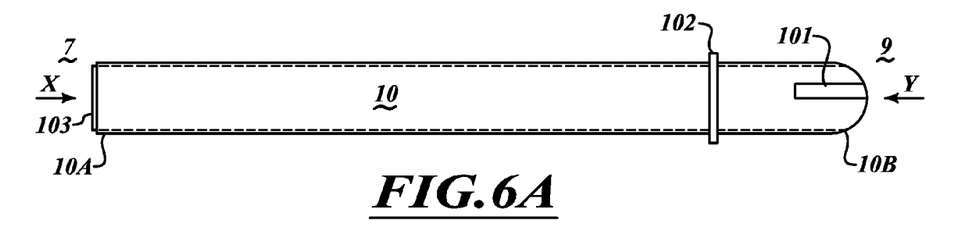
FIG. 6 shows various views of a rod-shaped light according to one embodiment of the invention.
Figure 6B:
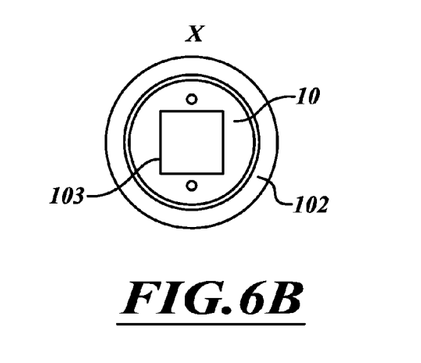
Figure 6C:
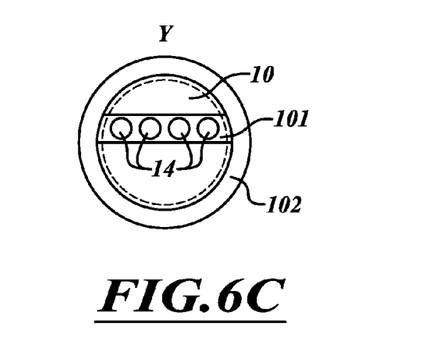

FIG. 6 shows the rod-shaped light 10 itself as a side view (FIG. 6A), a front view (FIG. 6B) and a rear view (FIG. 6C). The rod-shaped light 10 is made overall from metal. Provided in its outer end 10B is a light emission opening 101, behind which the lighting means 14 are disposed so that they can emit light into the surrounding area 9. The rod-shaped light 10 also has a peripherally extending ring 102 (abutment ring) which exactly defines how far the light 10 can be pushed into the sleeve 17. That therefore positively determines the amount by which the light then protrudes from the pylon. It is also possible to see a small step 103 at the end 10A of the rod-shaped light 10, which faces into the interior of the pylon. That step is for example in the form of a square which can be clearly seen in the rear view in FIG. 6B.

As soon as the rod-shaped light 10 is inserted into the sleeve 17 its horizontal orientation is already established by the configuration of the sleeve 17. Adaptation of the orientation can and then must still be effected around the longitudinal axis of the rod-shaped light 10 so that the light emission opening at the other end of the rod-shaped light is oriented precisely horizontally. For that purpose for example a spirit level can be applied to the square 103 and thus the correct orientation can be found. As soon as that orientation has been established the rod-shaped light 10 is fixed by means of the pipe clamp 21 (see FIG. 5B) and is thus in its correct installation and operating position.

Figure 7A:
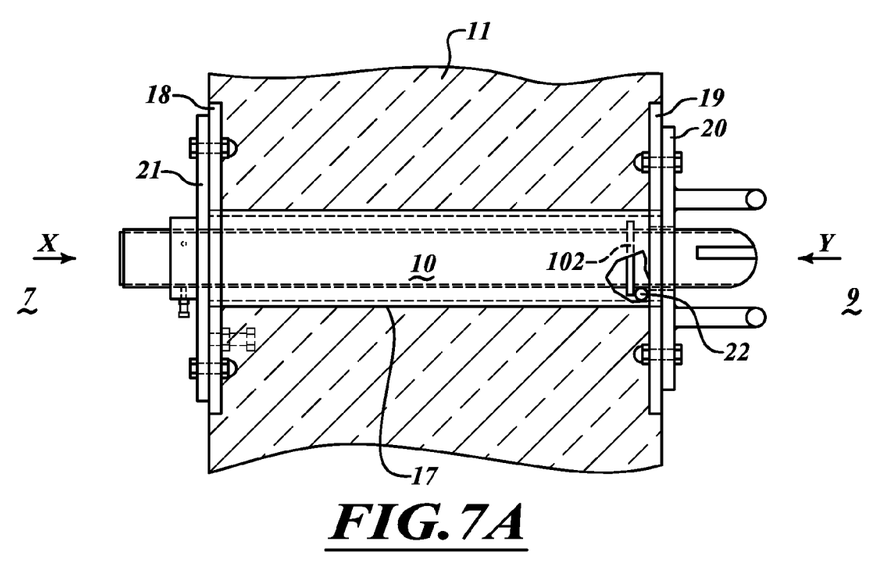
FIG. 7 shows a cross-section through a pylon wall and plan views of the ramming protection and the pipe clamp with installed rod-shaped light according to one embodiment.
Figure 7B:
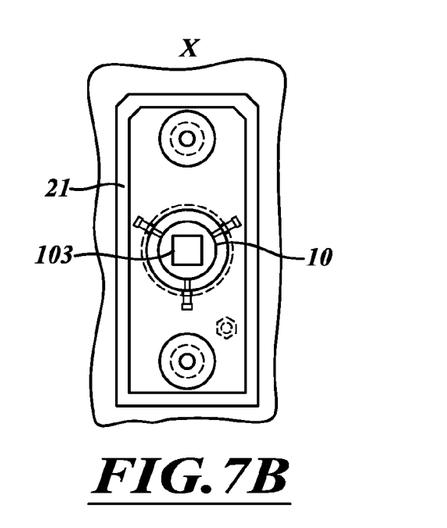
Figure 7C:
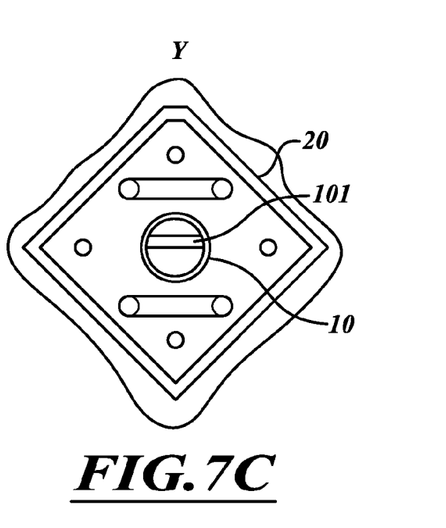

The rod-shaped light is shown in FIG. 7 in the installed condition. Shown therein, in the cross-section of FIG. 7A, is the way in which the rod-shaped light 10 is fitted into the sleeve 17. It is also possible to see a ring seal 22 which is disposed between the abutment ring 102 and the outer plate 19. When the rod-shaped light 10 is removed, a new seal 22 is then always used when re-fitting it or when installing a new rod-shaped light 10, so that this always guarantees a sealing fit for the rod-shaped light 10 in the sleeve 17 and moisture cannot penetrate in that way into the sleeve 17 and thus into the wind power installation. FIGS. 7B and 7C each show plan views of the rod-shaped light 10 in the installed condition from the inside (FIG. 7B) and from the outside (FIG. 7C) respectively.

Regarding the dimensions it is also to be noted that in one embodiment the outside diameter of the abutment ring 102 substantially corresponds to the outside diameter of the sleeve 17.

In regard to the rod-shaped light itself it is also to be noted that three variants can be envisaged. In the first variant no electronics are contained in the rod-shaped light 10 itself. That provides that the rod-shaped light is of a very simple structure. It will be noted however that the feed lines may be provided in a correspondingly complicated and expensive fashion, precisely if the supply for the individual lighting means is to be as fail-safe and independent of each other as possible and if a return line, for example for a photoresistor, is even to be provided, in order to permit functional monitoring.

In a further variant of the rod-shaped light electronics are provided in the rod-shaped light itself. In that case a distinction can again be made between an embodiment in which the electronics actuate the lighting means in dependence on trigger signals which in turn are generated by a central control, and a variant in which complete actuation is provided outside the rod-shaped light and the electronics contained in the rod-shaped light essentially perform driver functions for the lighting means.

In accordance with one embodiment of the invention the following assembly method is now described:

1. In a first step the sleeve 17 with the plates 18, 19 fixed thereto is also concreted in position during production of the precast concrete members. It will be appreciated that this is not required when dealing with steel pylons. There a suitable bore in the pylon is sufficient, into which the sleeve 17 can be fitted. It is to be noted that the steel pylon possibly has to be reinforced around the bore in order to ensure that the loads involved are securely carried as otherwise the steel pylon would be weakened by the bore or bores.

2. During erection of the pylon the ramming protection 20 is fitted in a second step.

3. After erection of the pylon the sealing ring 22 is fitted on to the front part of the rod-shaped light 10 at the abutment ring 102.

4. In the next step the light 10 is inserted into the sleeve 17.

5. Thereafter the pipe clamp 21 is fitted on, from the interior 7 of the pylon.

6. The light 10 is oriented by means of a spirit level.

7. The position established in that way for the rod-shaped light 10 is fixed with the pipe clamp 21.

8. The rod-shaped light then also has to be connected and can then be set in operation.

In order to be able to reach the rod-shaped light according to one embodiment of the invention from the interior of the pylon, which is to be attained so that access does not have to be from the exterior which involves a high level of complication and expenditure such as for example with a crane or a lifting platform, in a configuration disposed in the interior of the pylon at a predetermined spacing beneath the rod-shaped light are catwalk rings 23 (see FIG. 8, left-hand half and FIG. 9A) or grating grids 24 (see FIG. 8, right-hand half and FIG. 9B) as well as an additional safety ring 25. The catwalk rings 23 can be reached by way of the ladders which are to be found in any wind power installation and are so installed that the rod-shaped light 10 is approximately at chest height of the engineer who is standing on the catwalk rings 23.

Figure 9A:
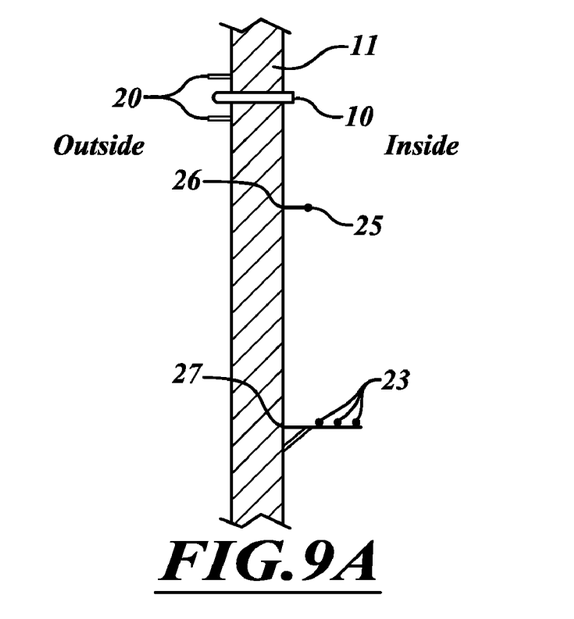
FIG. 9 shows cross-sections through a pylon wall with catwalk rings or grating grids respectively according to one embodiment.

FIG. 9A is a view in cross-section of a part of the pylon wall, showing an installed rod-shaped light 10 and the ramming protection 20. Firstly, provided beneath the rod-shaped light 10 is a safety ring 25 which extends around the pylon at the inside periphery thereof. It will be appreciated that it can be interrupted for example in the region of the ladder. That safety ring is fixed to the pylon wall 11 by means of first (short) brackets 26. Disposed beneath the safety ring 25 are second brackets 27, on which catwalk rings 23 are fixed in the design configuration shown in FIG. 9A. Those catwalk rings can again extend around the pylon on the inside thereof and are so spaced that an engineer can safely stand thereon. The number (three in the configuration shown in FIG. 9A) may be any suitable number. It will be appreciated that there can also be four, five or more catwalk rings.

Figure 9B:
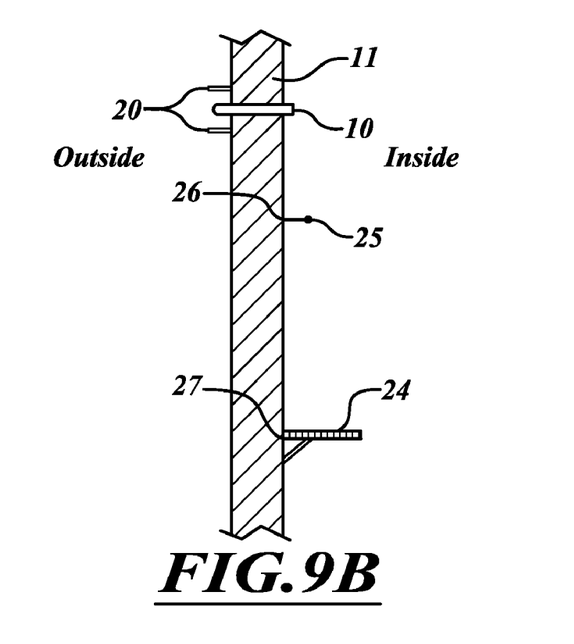

The embodiment shown in FIG. 9B, instead of the catwalk rings 23, has a grating grid 24. That grating grid 24 can be segmented and can be provided in place of the catwalk rings 23 on the second brackets 27 as a catwalk surface for reaching the rod-shaped light 10.

Figure 8:
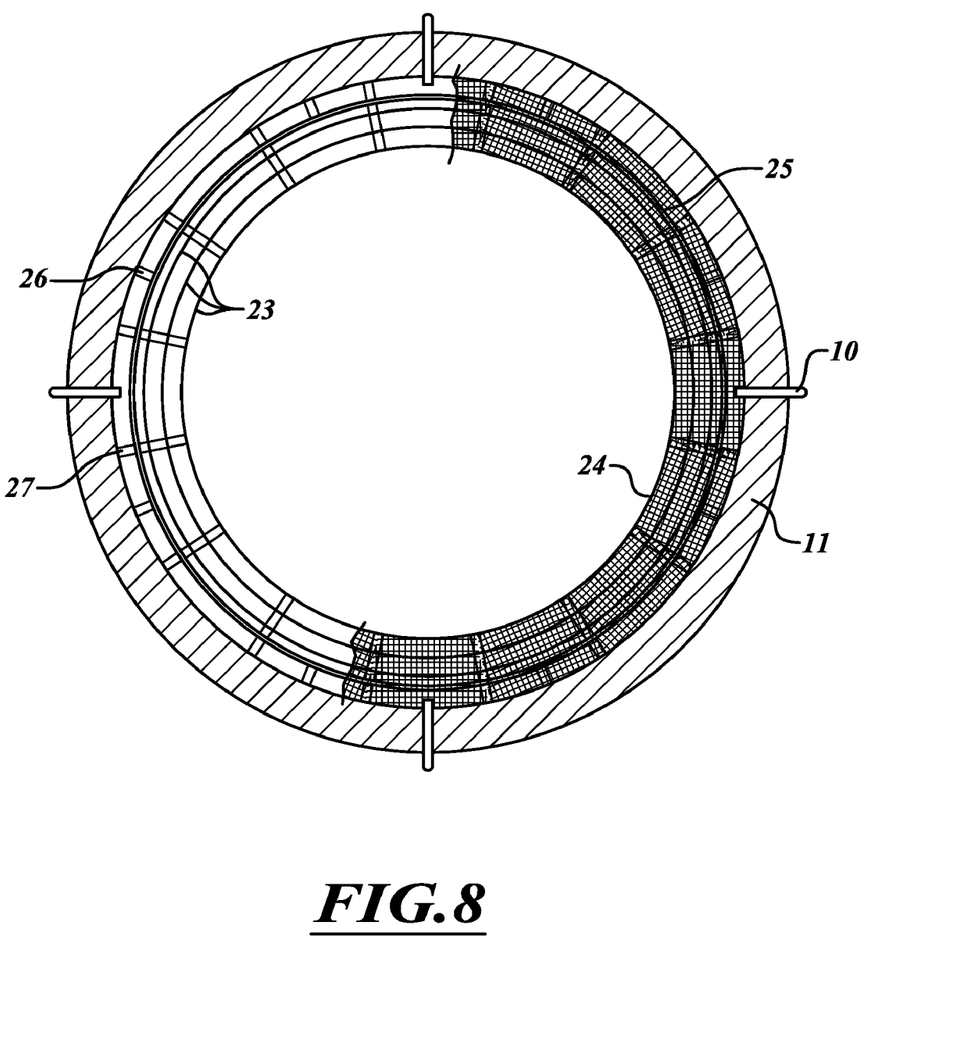
FIG. 8 shows a cross-section through a pylon with catwalk rings or grating grids respectively according to one embodiment.

In the plan view shown FIG. 8, rod-shaped lights 10 are provided in the pylon wall 11 each spaced through 90°. The safety ring 25 is fixed to the pylon wall 11 by means of the first brackets 26 in concentric relationship with the pylon wall and extends once around the pylon in the interior thereof. The ladder has been omitted here for reasons of simplification.

The catwalk surface which is fixed to the pylon wall 11 by means of the second brackets 27 is here shown in the left-hand half of the pylon in the form of catwalk rings 23 while provided in the right-hand half are grating grid segments 24 which by virtue of their configuration supplement each other to constitute a circle or a circular ring. In an individual case it is possible to provide catwalk rings or grating grids which then appropriately extend completely around the pylon.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising a pylon wherein at least two rod-shaped lights are arranged in bores disposed in a pylon plane for marking the pylon with lights, each rod-shaped light comprising:
 a rod-shaped holder including;
  a first end;
  lighting elements arranged at the first end;
  a second end; and
  lighting connections arranged at the second end in such a way that the rod-shaped light is adapted to be fitted by means of the rod-shaped holder from an inside of the pylon of a wind power installation through a bore in a pylon wall so that the lighting elements radiate into a surrounding area of the pylon, the rod-shaped holder being substantially cylindrical.

2. A wind power installation according to claim 1 wherein a weathering-resistant protective layer is disposed over the lighting elements.

3. A wind power installation according to claim 2 wherein a protective device to protect the device from items striking the device is disposed over the protective layer.

4. A wind power installation according to claim 1 wherein the lighting elements are connected in series.

5. A wind power installation according to claim 1 wherein the lighting elements are LEDs.

6. A wind power installation according to claim 1 wherein the lighting elements are arranged in a line.

7. A wind power installation according to claim 1 comprising a guide for horizontal orientation of the rod-shaped light in the bore provided in the pylon wall.

8. A wind power installation according to claim 1 comprising a signal device for functional monitoring of the lighting elements.

9. A wind power installation according to claim 1 wherein provided at the second end are means for horizontal orientation of the rod-shaped light.

10. A wind power installation according to claim 1 wherein an abutment ring is provided in a region of the first end for defining a depth of insertion into the bore in the pylon wall.

11. A wind power installation according to claim 1 wherein a sleeve for horizontal orientation of the rod-shaped light is arranged in the bore in the pylon wall.

12. A wind power installation according to claim 1 wherein the bores are so disposed that light emitting from the rod-shaped lights can be seen from any direction around the pylon.

13. A wind power installation according to claim 1 wherein provided at an inner surface of the pylon wall around the bore is a pipe clamp with means for horizontally orienting and fixing the rod-shaped light.

14. A wind power installation according to claim 1 wherein provided at an outer surface of the pylon wall around the bore is a ramming protection having means for protecting an outer end of the rod-shaped light from mechanical damage.

15. A wind power installation according to claim 1 wherein catwalk rings or grating grids are provided at an inner surface of the pylon wall.

16. A pylon of a wind power installation, comprising at least two rod-shaped lights arranged in bores disposed in a pylon plane for marking the pylon with lights, each rod-shaped light comprising:
 a rod-shaped holder including a first end;
 lighting elements arranged at the first end a second end; and
 lighting connections arranged at the second end in such a way that the rod-shaped light is adapted to be fitted by means of the rod-shaped holder from an inside of the pylon through a bore in a pylon wall so that the lighting elements radiate into a surrounding area of the pylon, the rod-shaped holder being substantially cylindrical.

17. A method of mounting a light marking arrangement of a pylon of a wind power installation comprising:
 moving a first end of a rod-shaped light from inside of the pylon through a bore in a pylon wall into a position of being visible from an outside of the pylon; and
 connecting lighting means connections of a second end of the rod-shaped light to supply lines arranged in the inside of the pylon, wherein the rod-shaped light comprises a first end; lighting elements arranged at the first end; a second end; and lighting connections arranged at the second end in such a way that the rod-shaped light is adapted to be fitted by means of the rod-shaped holder from an inside of the pylon trough a bore in a pylon wall so that the lighting elements radiate into a surrounding area of the pylon, the rod-shaped holder being substantially cylindrical.

18. A method of mounting a light marking arrangement of a pylon of a wind power installation, the method comprising:
 forming a bore in a pylon wall;
 introducing a sleeve into the pylon wall;
 mounting ramming protection around an outer opening of the bore;
 inserting a rod-shaped light into the sleeve from an interior of the pylon;
 mounting a pipe clamp in the interior of the pylon around the bore;
 horizontally orienting the rod-shaped light and fixing a position thereof; and
 connecting supply lines to the rod-shaped light from the interior of the pylon wherein the rod-shaped light comprises a first end; lighting elements arranged at the first end; a second end; and lighting connections arranged at the second end in such a way that the rod-shaped light is adapted to be fitted by means of the rod-shaped holder from an inside of the pylon trough a bore in a pylon wall so that the lighting elements radiate into a surrounding area of the pylon, the rod-shaped holder being substantially cylindrical.

* * * * *

UNITED STATES PATENT AND TRADEMARK OFFICE
CERTIFICATE OF CORRECTION

| | | |
|---|---|---|
| PATENT NO. | : 7,850,354 B2 | Page 1 of 1 |
| APPLICATION NO. | : 11/814278 | |
| DATED | : December 14, 2010 | |
| INVENTOR(S) | : Aloys Wobben | |

It is certified that error appears in the above-identified patent and that said Letters Patent is hereby corrected as shown below:

Column 9, Line 13
"lighting elements arranged at the first end a second end; and" should read, --lighting elements arranged at the first end; a second end; and--.

Column 1, Line 53
"retrofitted with a light marking arrangement for safeguarding" should read, --retro-fitted with a light marking arrangement for safeguarding--.

Column 3, Line 49
"The option of retrofitting a pylon or equipping a pylon" should read, --The option of retro-fitting a pylon or equipping a pylon--.

Signed and Sealed this
Tenth Day of May, 2011

David J. Kappos
*Director of the United States Patent and Trademark Office*